May 18, 1965  B. W. KING  3,183,870
DUMPING BARGE WITH PIVOTED SIDE RAILS
Filed Feb. 1, 1963  11 Sheets-Sheet 1
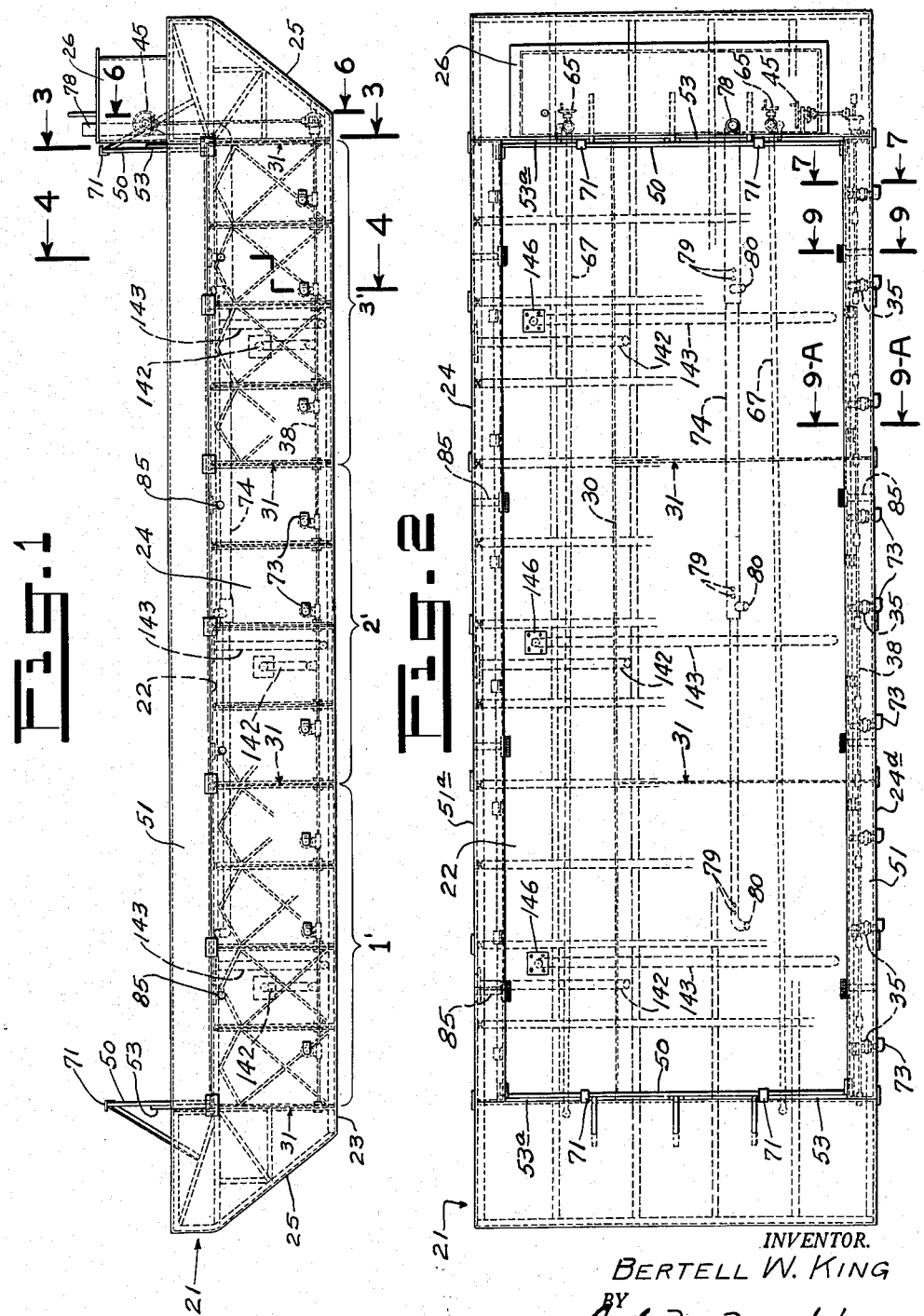
INVENTOR.
BERTELL W. KING
BY
John M. Montstream
ATTORNEY

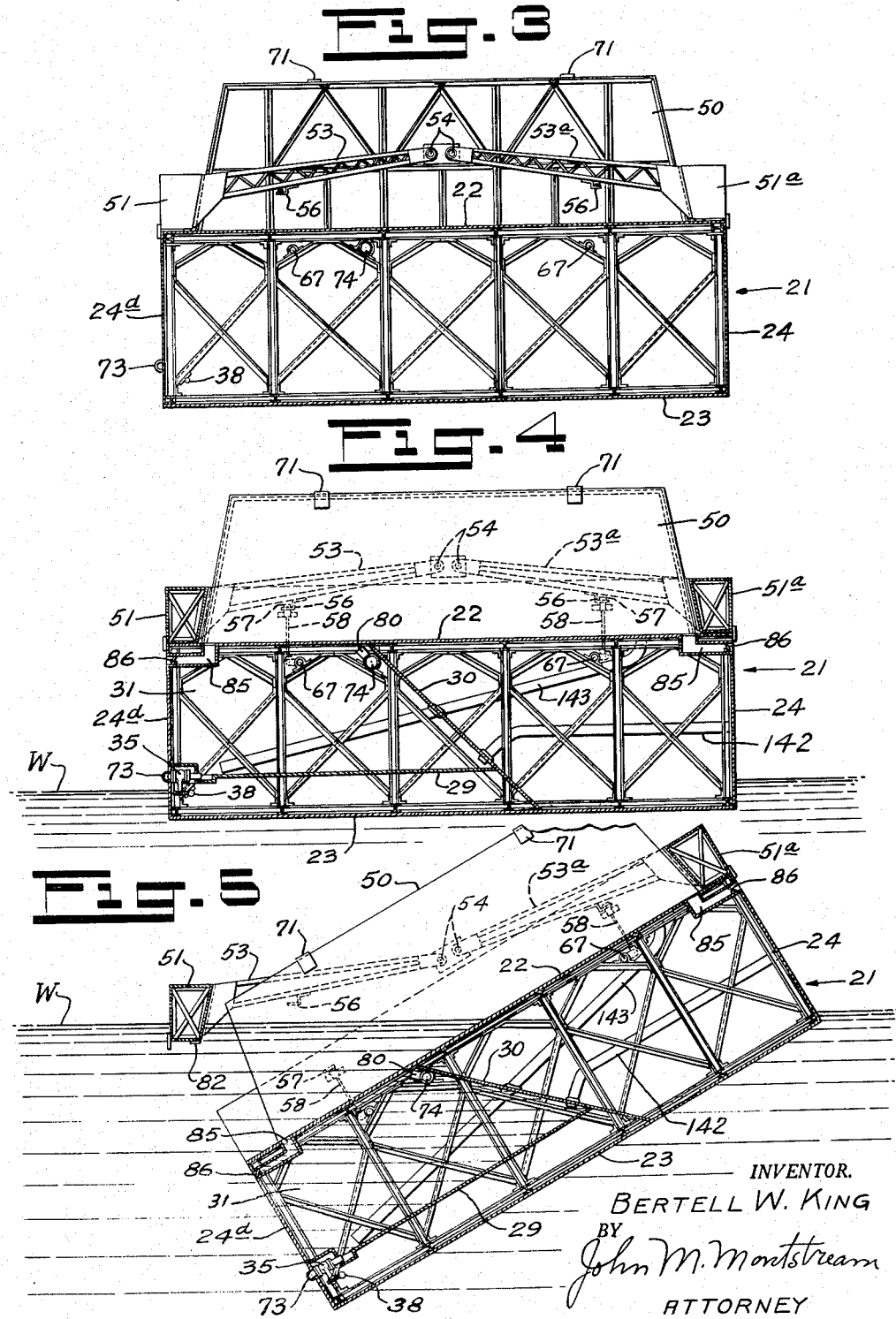

May 18, 1965 B. W. KING 3,183,870
DUMPING BARGE WITH PIVOTED SIDE RAILS
Filed Feb. 1, 1963 11 Sheets-Sheet 3
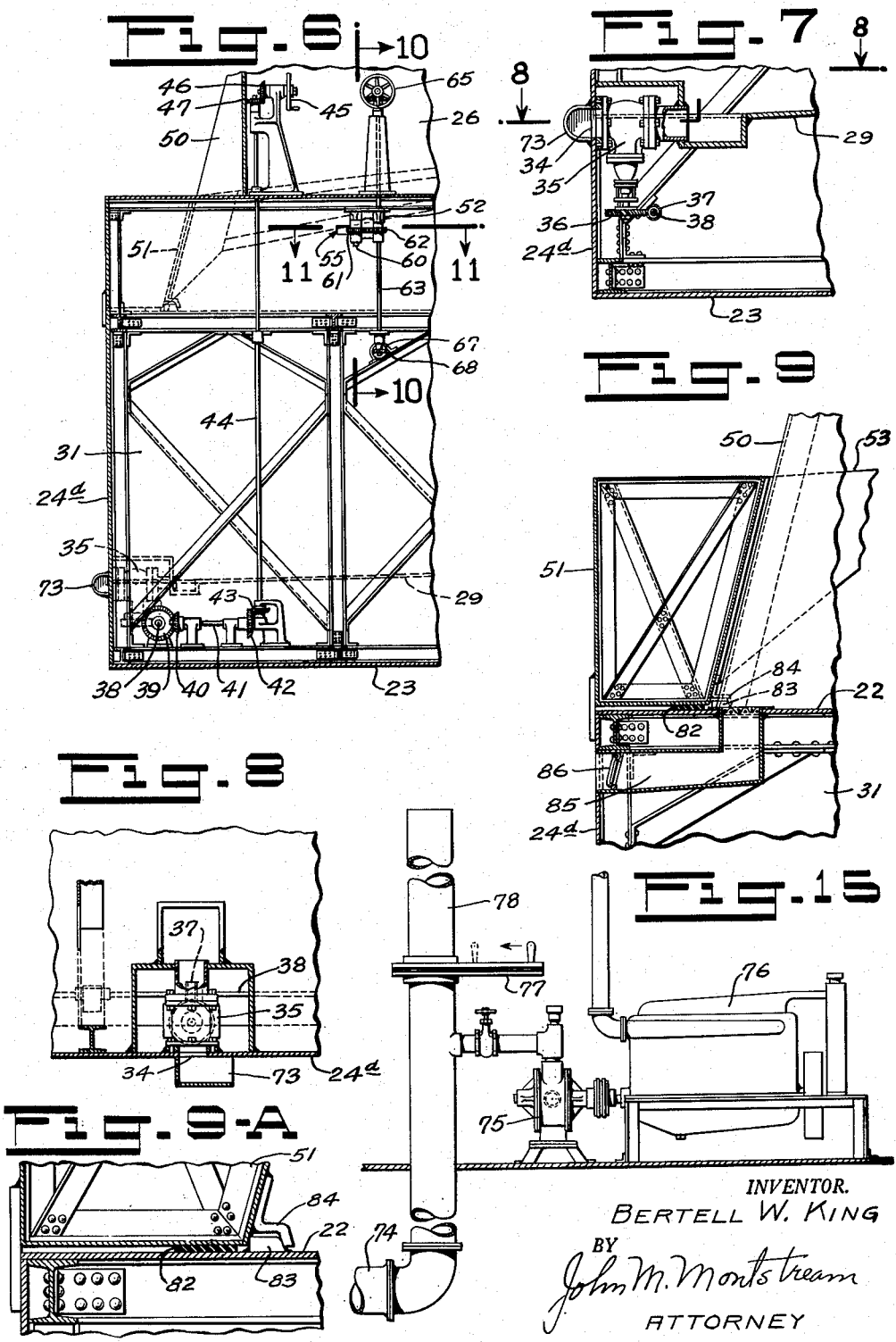
INVENTOR.
BERTELL W. KING
BY
John M. Montstream
ATTORNEY

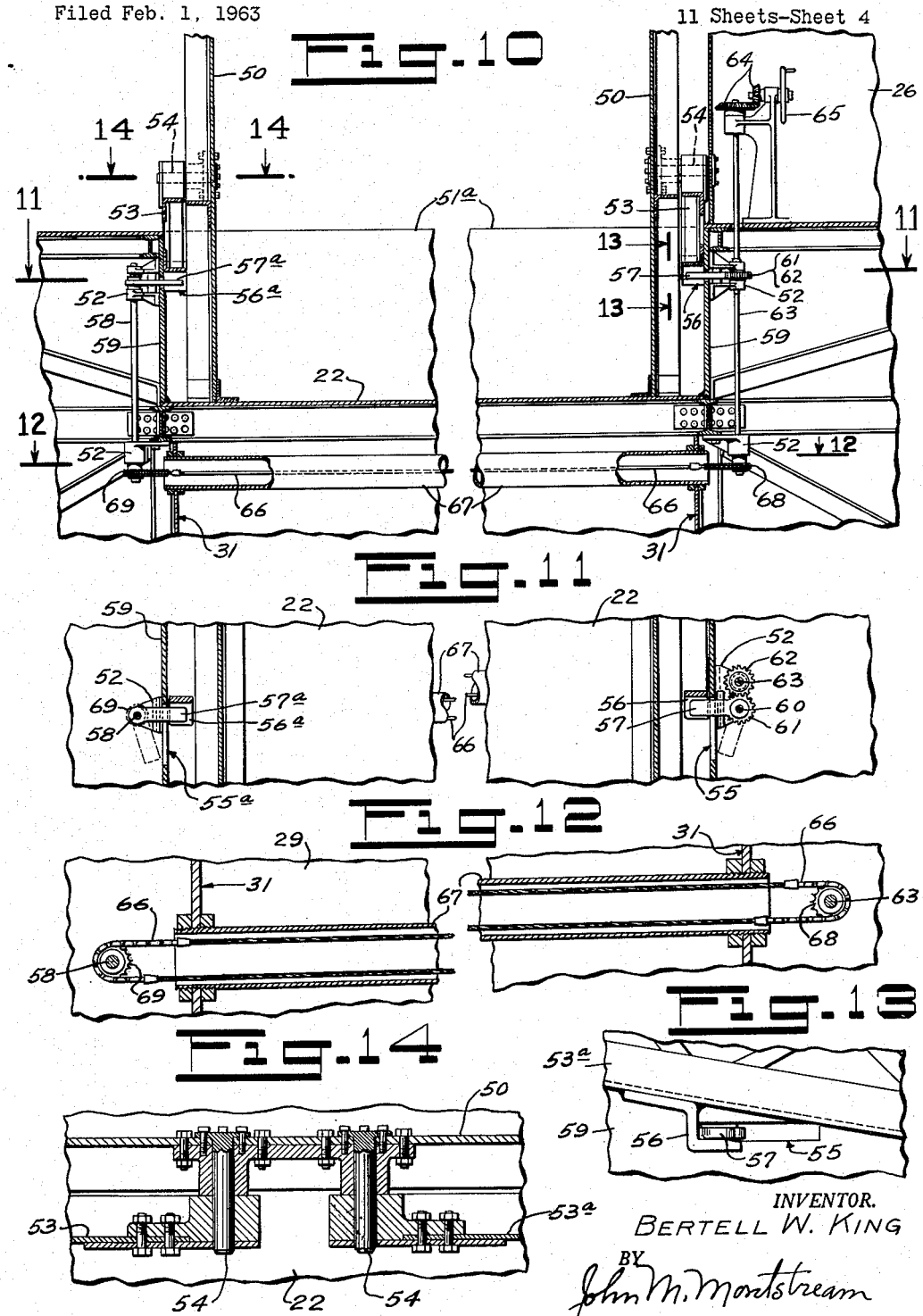

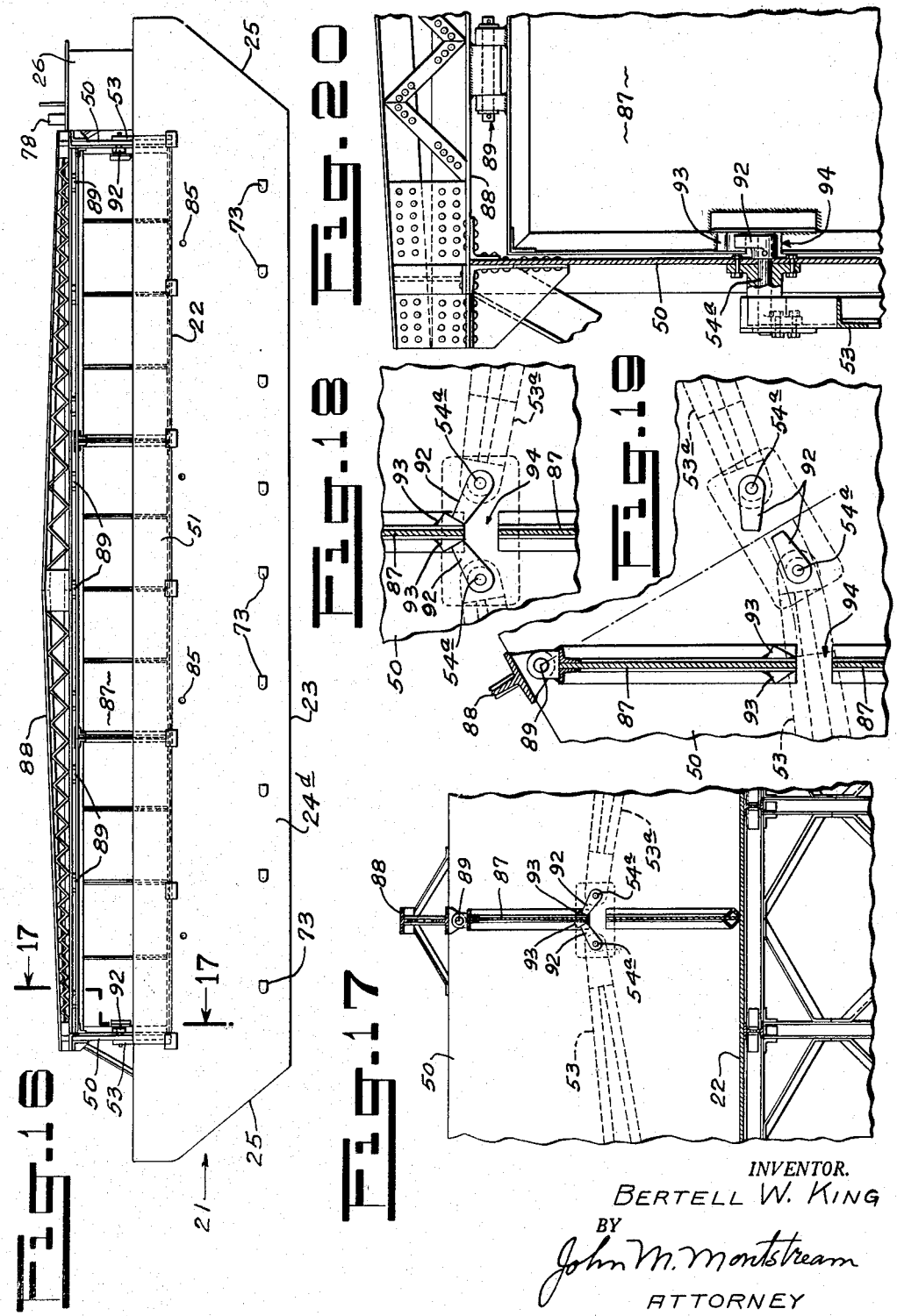

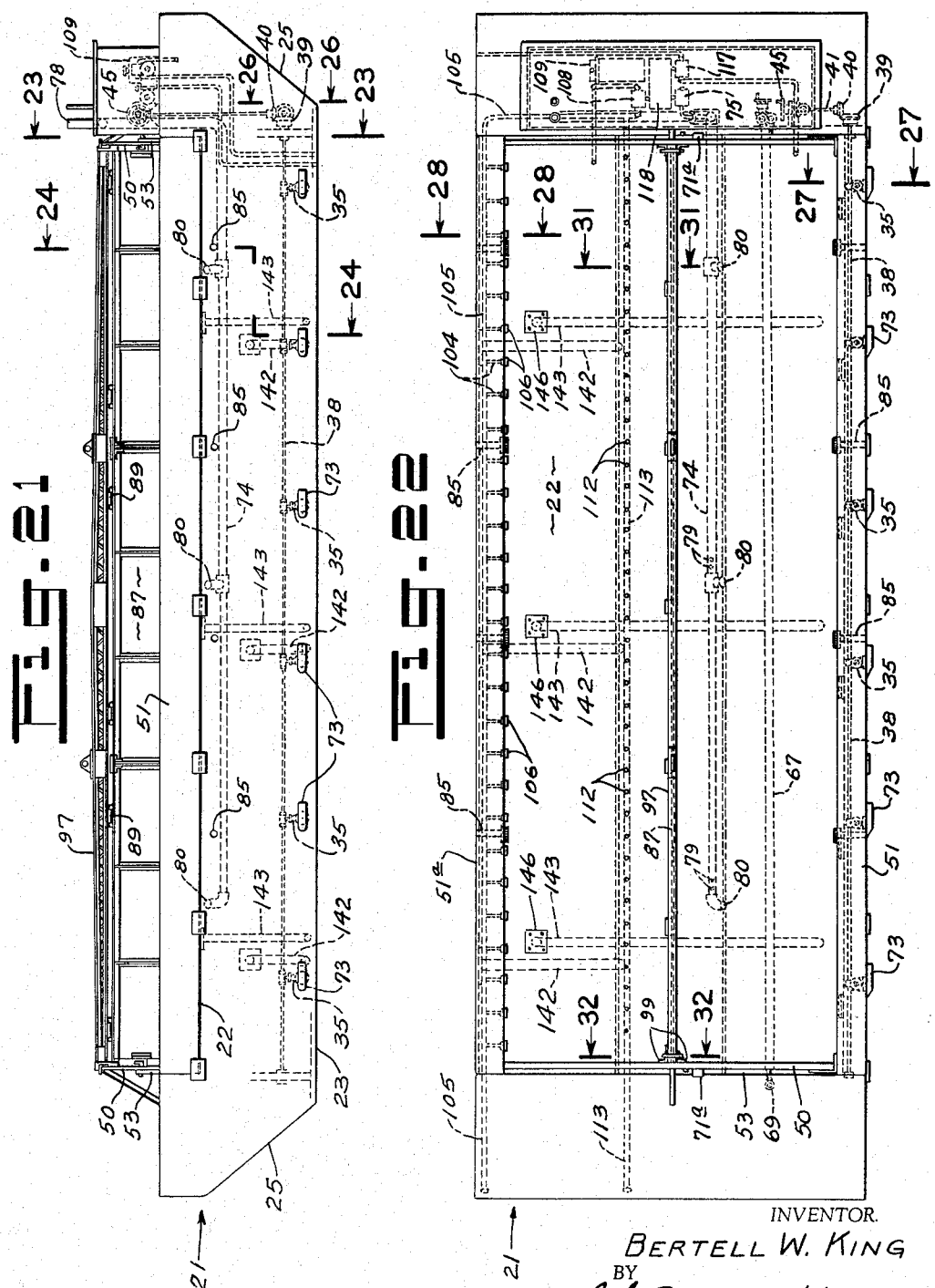

May 18, 1965 B. W. KING 3,183,870
DUMPING BARGE WITH PIVOTED SIDE RAILS
Filed Feb. 1, 1963 11 Sheets-Sheet 7
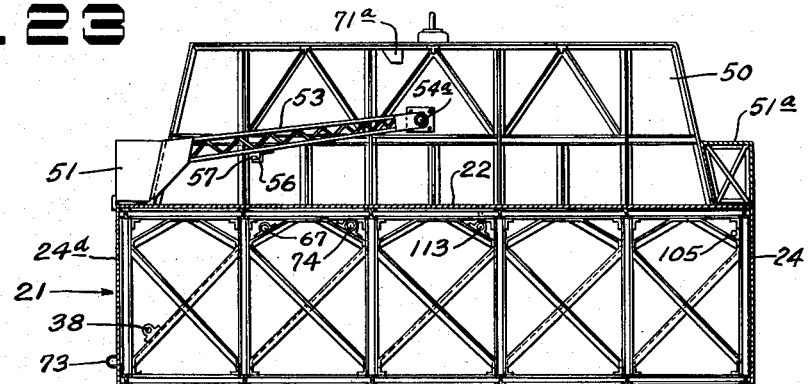
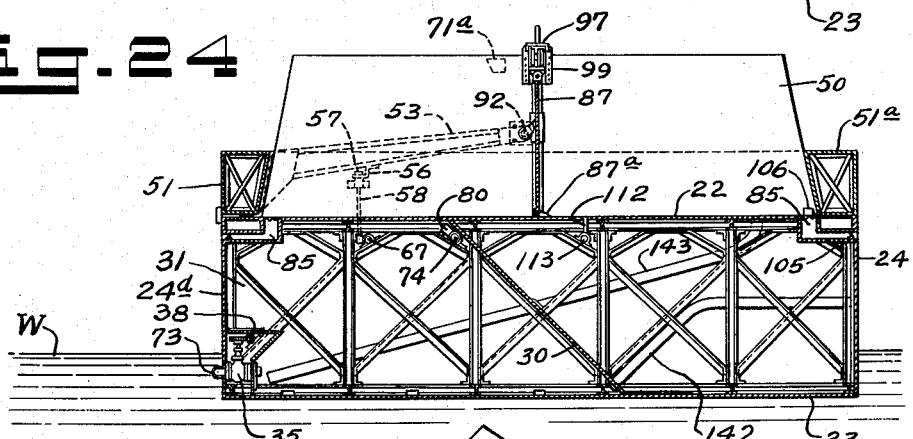
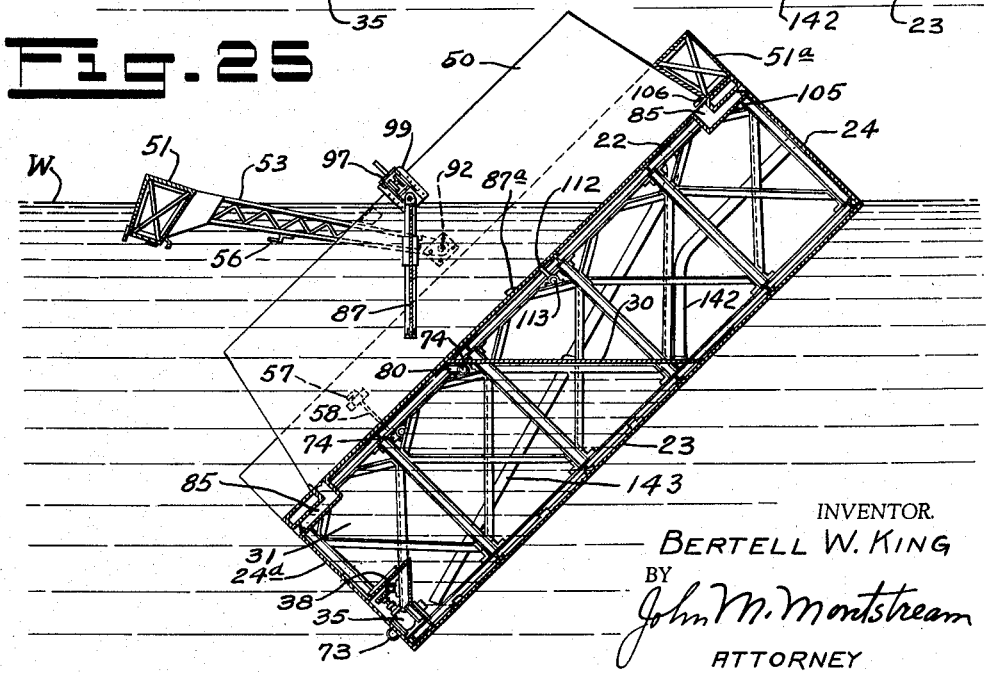
INVENTOR.
BERTELL W. KING
BY
John M. Montstream
ATTORNEY May 18, 1965  B. W. KING  3,183,870
DUMPING BARGE WITH PIVOTED SIDE RAILS
Filed Feb. 1, 1963  11 Sheets-Sheet 8
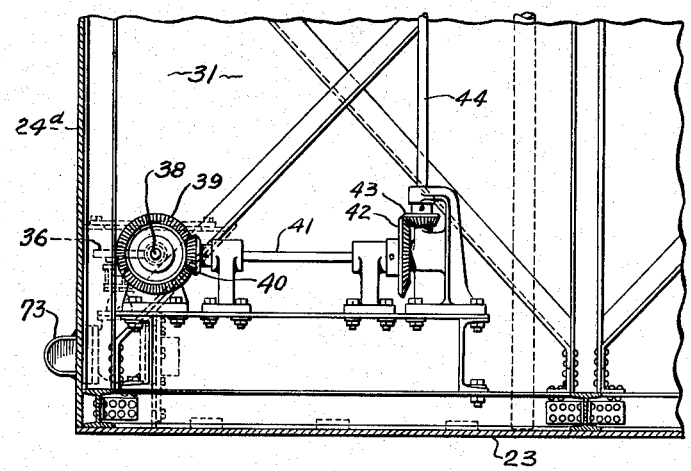
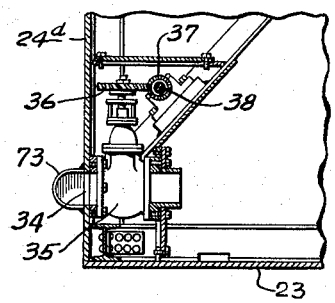
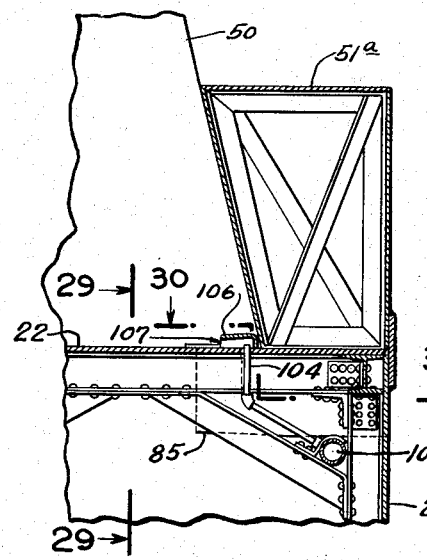
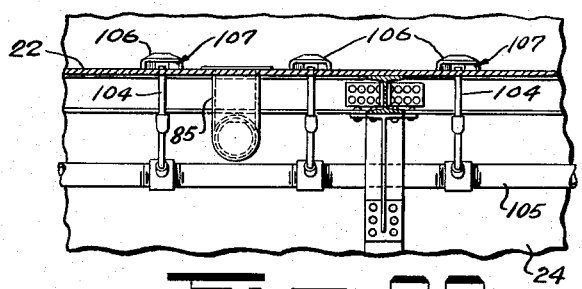
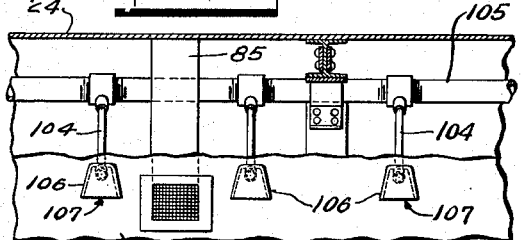
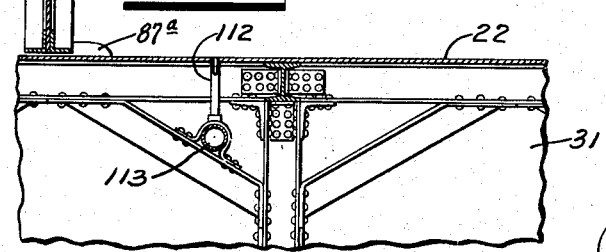
INVENTOR.
BERTELL W. KING
BY
John M. Montstream
ATTORNEY May 18, 1965  B. W. KING  3,183,870
DUMPING BARGE WITH PIVOTED SIDE RAILS
Filed Feb. 1, 1963  11 Sheets-Sheet 9
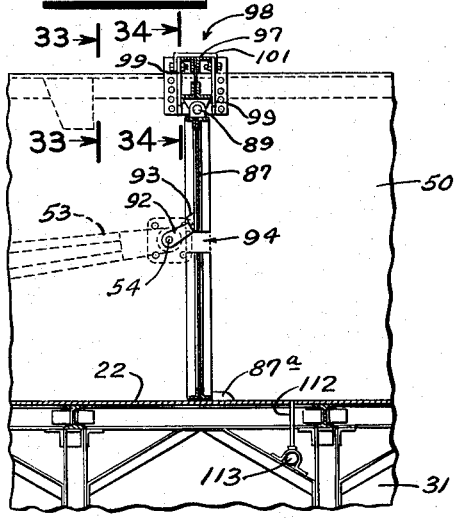
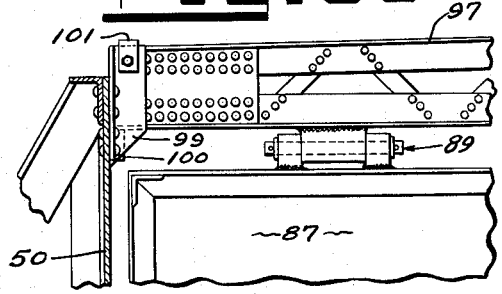
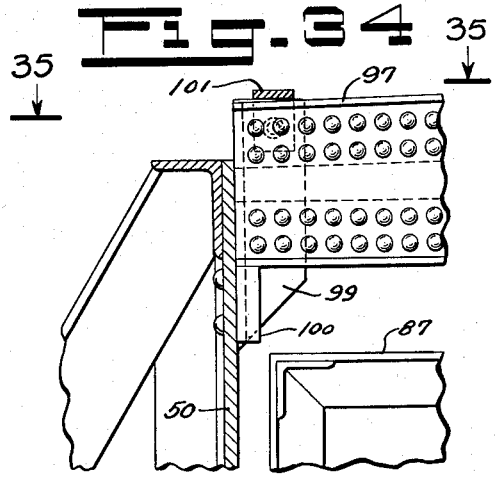
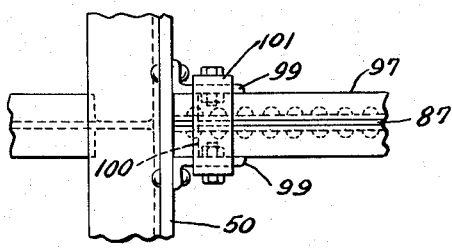
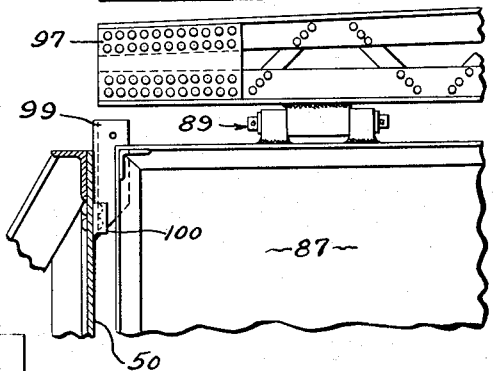
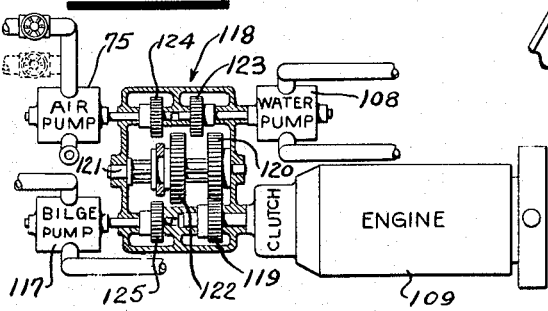
INVENTOR.
BERTELL W. KING
BY
John M. Montstream
ATTORNEY

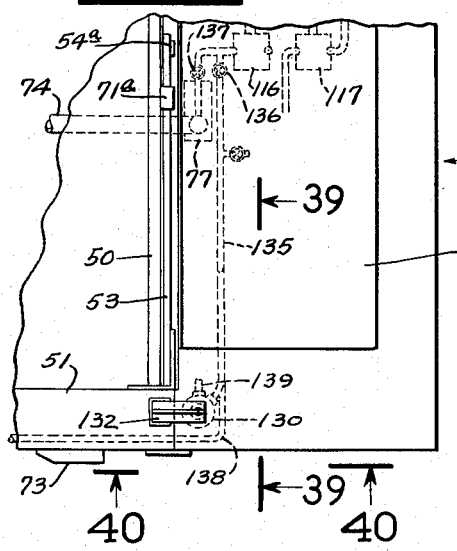
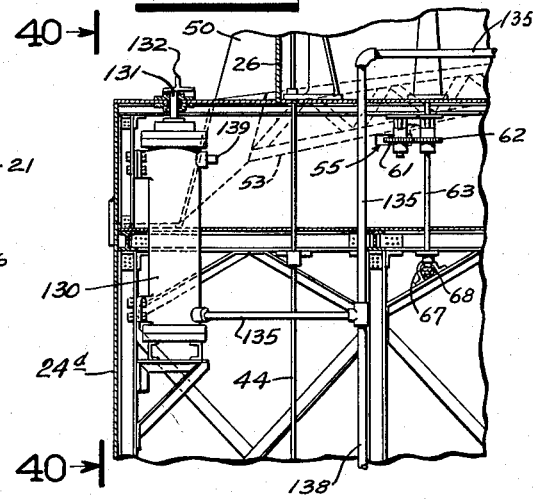
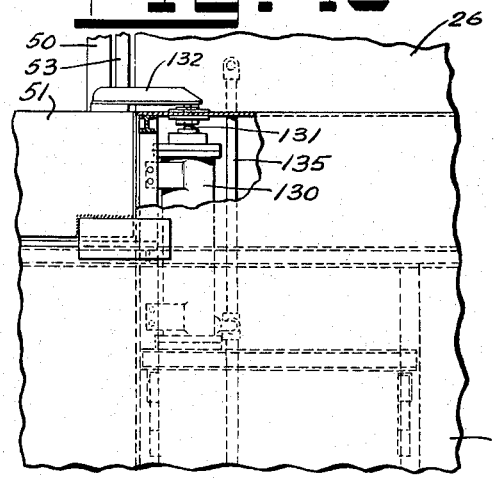
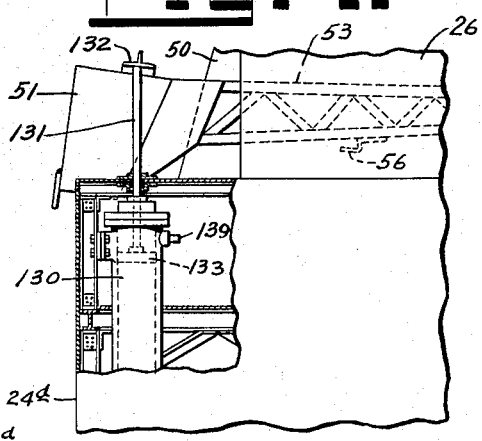
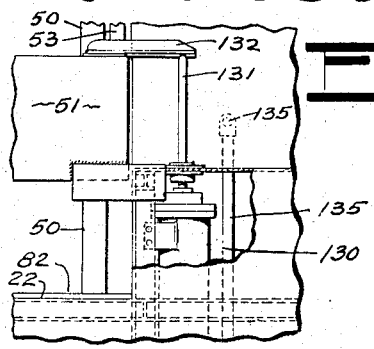

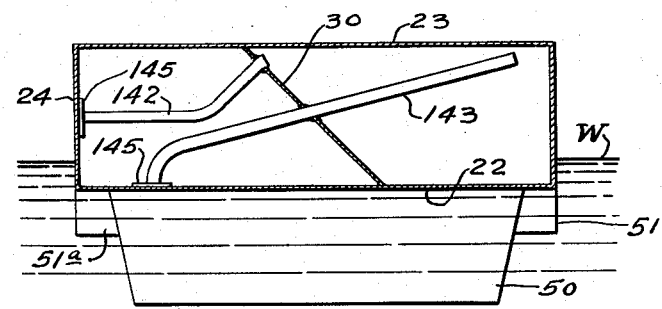
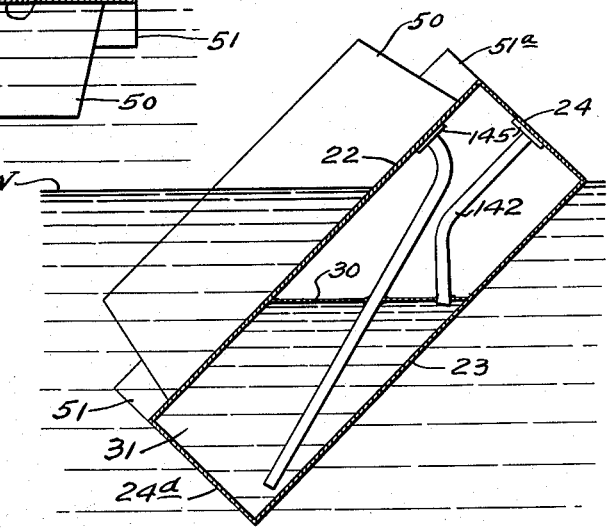
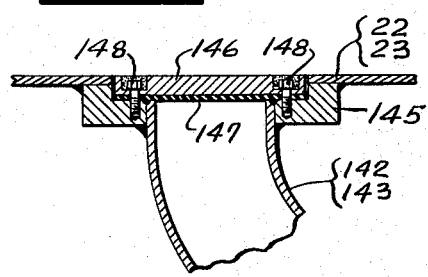
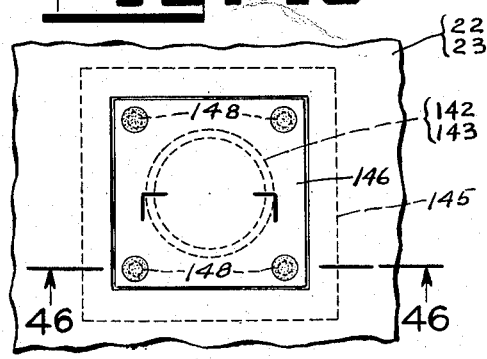

United States Patent Office 3,183,870
Patented May 18, 1965

3,183,870
DUMPING BARGE WITH PIVOTED SIDE RAILS
Bertell W. King, 17 Battery Place, New York, N.Y.
Filed Feb. 1, 1963, Ser. No. 256,796
17 Claims. (Cl. 114—32)

The invention relates to a barge or scow having a hull which is normally water tight so that it is buoyant and a deck on which the load is carried. At least one side of the hull is divided into one or more flood compartments which can be flooded so that an overturned barge can be easily righted or for a dump barge when it is desired to dump the load on deck, the barge is substantially tilted on its side by the flooding. For a dump barge the load is retained on deck by rail means including a rail on each side, and the rail on at least one side and preferably on both sides are mounted to be movable away from the deck. The movable side rail or rails are enclosed structures of substantial dimension so that they float and have substantial buoyance. When the scow or barge is tilted for dumping, the side rail floats above the deck because of its buoyancy and the load slides off the deck underneath the floating rail. In the preferred construction the rail, or rails, have a limited extent of movement such that its buoyancy is added to that of the barge when the barge tilt is at its maximum effective angle. The invention also relates to a longitudinally extending hinged barricade to prevent or diminish load shift and which does not obstruct dumping of the load. An automatically releasable retaining means for the barricade also may be provided.

It is an object of the invention to construct a barge or scow which has one or more flood compartments on at least one side in order to tilt the barge for either righting an overturned barge or for dumping load.

Another object is to provide a dump barge with a buoyant rail at least on the flood compartment side and mounted to be floated above the deck such that when the barge is tilted for dumping, the rail is floated above the deck to allow the load to slide off of the deck beneath the floating rail.

Another object of the invention is as above but to construct the rail of substantial size with sufficient buoyancy so that if the barge tends to tilt too far, the buoyancy of the rail will be added to that of the barge to retain the barge from tilting beyond a desired angle.

Another object of the invention is to provide a dump scow or barge as above with a longitudinally extending and pivotal barricade at the center of the barge which is normally retained in position against pivotal movement to prevent shifting of the load which retaining means may be released and allow the barricade to pivot so that the load on the high side of the deck may slide freely to the other side.

Another object is as in the preceding paragraph in which the retaining means is automatically released upon a predetermined amount of separation of the buoyant rail off of the deck or by a predetermined angular movement of pivotal arms particularly shown as the mounting means for the rail.

Another object is to provide jack means to assist in freeing the rail in the event that load pressure thereon binds the same.

A still further object is to provide a barge for dumping and having a central barricade which can be removed.

Other objects of the invention will be more apparent from the following description when taken in connection with the accompanying drawings illustrating a preferred embodiment thereon in which:

FIG. 1 is a side elevation of the scow;
FIG. 2 is a top view of the scow;
FIG. 3 is a sectional view through the scow taken on line 3—3 of FIG. 1;
FIG. 4 is a sectional view through the scow taken on line 4—4 of FIG. 1;
FIG. 5 is a sectional view similar to FIG. 4 but with the scow tilted for dumpinug its load;
FIG. 6 is a partial section of view taken on line 6—6 of FIG. 1 showing operating mechanism for the valve controlling flooding of the compartments and the operating mechanism for releasing the locking means for locking the rails against the deck;
FIG. 7 is an enlarged partial view taken on line 7—7 of FIG. 2 of a valve and the adjacent valve operating means;
FIG. 8 is a sectional view taken on line 8—8 of FIG. 7;
FIG. 9 is an enlarged partial sectional view taken on line 9—9 of FIG. 2 through the rail;
FIG. 9A is a partial sectional view taken on line 9A—9A of FIG. 2, showing interengaging means for the rail to give support against lateral strain;
FIG. 10 is an enlarged sectional view taken on line 10—10 of FIG. 6 showing the operating means for the rail or arm locking means;
FIG. 11 is a partial top view taken on line 11—11 of FIG. 6 or of the rail or rail arm locking means;
FIG. 12 is a partial view on line 12—12 of FIG. 10 of the connection between the rail or rail arm locking means and forming a part of the operating means;
FIG. 13 is a partial end view taken on line 13—13 of FIG. 10 looking at the rail or arm locking means;
FIG. 14 is a detail sectional view taken on line 14—14 of FIG. 10 of the pivots for the rail arms;
FIG. 15 is a detail view of a motor driven air pump for speeding up the outward flow of water from the flood compartment;
FIG. 16 is a side view of the scow showing a center barricade and a supporting beam therefor;
FIG. 17 is a partial sectional view taken on line 17—17 of FIG. 16 showing the automatically operated center barricade release means;
FIG. 18 is an enlarged view of the retaining means for the central barricade or partition;
FIG. 19 is an enlarged partial view of the center barricade or partition and its retaining means when dumping;
FIG. 20 is an enlarged partial sectional view of the barricade retaining means;
FIG. 21 is a side view of a barge with additional and modified forms of construction;
FIG. 22 is a plan view of the barge of FIG. 21;
FIG. 23 is a cross section through the barge taken on line 23—23 of FIG. 21;
FIG. 24 is a cross section through the barge taken on line 24—24 of FIG. 21;
FIG. 25 is a cross section through the barge similar to FIG. 24 with the barge in tilted dumping position;
FIG. 26 is an enlarged sectional view taken on line 26—26 of FIG. 21 showing a valve operating connection;
FIG. 27 is an enlarged view taken on line 27—27 of FIG. 22, showing an inlet valve means;
FIG. 28 is an enlarged partial cross section taken on line 28—28 of FIG. 22 showing a water flushing means for the deck;
FIG. 29 is a partial longitudinal section taken on line 29—29 of FIG. 28 showing the deck water flushing means;
FIG. 30 is a section taken on line 30—30 of FIG. 28 showing a top view of the deck flushing means;
FIG. 31 is a partial section taken on line 31—31 of FIG. 22 showing additional water flushing ports for the deck in the central region of the barge;
FIG. 32 is a partial section taken on line 32—32 of FIG. 22 showing the barricade or partition lock and release;
FIG. 33 shows the hinge construction for the center barricade as viewed from line 33—33 of FIG. 32;

FIG. 34 is an enlarged partial section taken on line 34—34 of FIG. 32 showing the socket construction for the end of the beam carrying the center barricade pivots;

FIG. 35 is a top view of the center beam socket or cradle as viewed from line 35—35 of FIG. 34;

FIG. 36 is a view of the end of the center beam lifted from its cradle;

FIG. 37 is a view of the engine and the connections with the pumps for the bilge, air and water;

FIG. 38 is a partial view of the barge showing the location of one jack to initially raise a movable rail;

FIG. 39 is a section taken on line 39—39 of FIG. 38 showing the jack as it is mounted on the barge;

FIG. 40 is a side view of a portion of the barge showing the jack for lifting the rail;

FIG. 41 is a partial view showing the jack extended and with the rail lifted.

FIG. 42 is a side view of a portion of the barge with portions cut away showing the jack in extended position with the rail lifted;

FIG. 43 is a view in cross section with details omitted of an overturned barge or scow with flood compartments and connections thereto for righting the same by flooding;

FIG. 44 is a view in cross section of the barge or scow with the compartments flooded and partially righted with the deck in an inclined up position;

FIG. 45 is an enlarged view of a cover plate construction for closing and sealing the connections with the flood compartment at the hull;

FIG. 46 is a view in cross section taken on line 46—46 of FIG. 45 of the cover plate means for the connection to the flood compartments.

The barge or scow includes a hull 21 of suitable construction having a load deck 22 on which a load to be dumped is carried, a bottom 23, a side 24 and a dump side 24d and ends 25. At one end of the barge is a cabin 26 in which operating mechanism may be housed. The cabin should be made tight so that it does not flood when the barge is tilted.

The hull of the barge or scow is divided into flood compartment means, comprising at least one flood compartment, three being partially shown. The bottom of the flood compartment means may be a little above waterline W when the scow is unloaded. So located, the flood compartment will be self draining when there is no load on the barge. The bottom of the flood compartment means is formed by a horizontal watertight mid-bottom 29 spaced above the hull bottom 23. The mid bottom is shown as extending from one side of the barge to a mid partition 30, shown particularly as extending at an angle with respect to the sides of the hull, and extending for at least the length of the flood compartments. The mid partition 30 is such that the lateral dimensions of the flood chamber means at the bottom is substantially greater than the lateral dimensions of the flood chamber means at the deck. The mid partition is in the center region of the barge. The horizontal partition or mid bottom 29 lever leaves an air chamber between it and the hull bottom. The mid partition 30 provides an air chamber on the other side of the hull. Since the flood compartment means, as shown, does not extend the full length of the hull, the ends of the hull also are a part of the buoyant air chamber. The angle of the mid partition may be roughly anywhere from 30 to 55 degrees and preferably is about 45 degrees at which angle it is roughly parallel with the water surface when the barge is fully tilted in dumping position as will appear. Preferably there are several flood compartments, formed by spaced lateral partitions 31 which divided the flood compartment means into three compartments numbered 1', 2' and 3'. When the barge is loaded, the mid bottom drops below the water level W so that water may flow into the flood compartments when the flood valves are opened.

At least one inlet connection (FIG. 7) with an inlet into the hull is provided for each flood compartment, three such inlets being shown for each compartment. The water inlets are about or at least somewhat below the level of the false bottom for hull drainage. Valve means are provided to flood the flood compartments, including a valve 35 for each inlet. The valves shown are gate valves, and desirably are located in the chamber below the mid bottom. These valves are normally closed until it is desired to dump the load on the deck.

Suitable valve operating mechanism (FIGS. 6, 7) is provided for operating the flood valve and that shown includes a worm gear 36 carried by the stem of each valve and a worm 37 for each gear and operatively meshing therewith. Each worm is secured to a worm shaft 38 extending longitudinally of the hull preferably in the air chamber between the mid bottom and the bottom of the hull when such is provided. At the cabin end of the barge the shaft 38 carries a bevel gear 39, with which a pinion 40 meshes which pinion is secured to a stub shaft 41. On this stub shaft is a second bevel gear 42 with which a pinion 43 meshes. This pinion is secured to a vertical shaft 44 extending upwardly into the cabin. A hand wheel 45 is connected with the vertical shaft through gearing 46, 47. Although all valves are shown as operated from the one hand wheel, it is clear that a separate valve operating means, as described, may be provided for the flood valve means for each of the flood compartments so that they may be selectively flooded. When it is desired to tilt the barge or scow and unload the load on the deck, the flood valves are opened so that water flows through the valve into the flood compartments and laterally unbalances the scow so that it and hence the deck tilt to dumping position and the load slides off of the deck.

At each end of the deck is an abutment 50 extending above the deck. At the sides of the load deck, rail means are provided, one rail being provided on each side of the deck and extending between the abutments. At least one of the rails is a float rail 51, and has mounting means for permitting the same to be floated off of the deck so that when dumping, the load slides beneath the float rail. The float rail may be of substantial dimensions to provide considerable buoyancy to float the rail against the pressure of the load. Preferably too the buoyant float rail is of substantial size to give it substantial buoyancy for tilt stability as will appear. As an illustration for a proposed barge or scow which is 130 feet long with a 40 foot beam by 11 feet from deck to bottom, a float rail having substantial buoyancy for its double function has been designed, which is 3 feet across the top, 2 feet across the bottom, 4 feet high and about 100 feet long, which rail has a buoyancy of about 20 tons when one third submerged. If increased buoyancy is desired the dimensions may be increased. The inward taper of the inner side towards the top of the rail aids in floating the rail against the pressure of the load thereagainst and allows the quick release from the load pressure when the rail begins to float vertically from the deck. A float rail is shown on each side of the barge or scow, although the barge is intended to tilt and unload on one side only. This is a precaution against rough seas when the load may shift to the side opposite from the flood compartments or the load is partially washed over the rail whereupon the rail on this side may be released to wash off some of the load and stabilize the barge.

The mounting means, particularly shown for a floating rail 51, includes at least two arms 53 with one arm secured at each end of the rail. Each arm is pivoted on its adjacent abutment 50 by a pivot 54 (FIG. 14) which in this figure is shown as secured to the abutment. With both rails mounted on pivoted arms, the pivots are located adjacent to the center of the abutments. In order to assure that the arms are free of interference from the load, each arm is located outside of its adjacent abutment, that is it is on the opposite side of the abutment from the load deck, and hence separated from the load by the abutment.

Holding means are provided for retaining or holding the rail means with the bottom of the rail against the deck.

This holding means (FIGS. 10 through 13) is shown as engaging the pivoted arms and includes a flange or shoulder 56 and 56a, one carried by each arm and a key 57, and 57a. Key 57 is pivotally mounted on a pivot 60 for rotation into contact and releasably away from its flange. The holding key 57a, as shown, is secured to a shift 58 pivotally mounted in suitable bearings 52 carried by an end wall 59. The holding key 57a (FIG. 11) is pivotally mounted on a shaft 60. Each key projects through a key slot 55, and 55a.

The keys are operatively connected together by key operating means for operation from within the cabin. The operating means provided includes a gear 61 secured to the pivot 60 which gear means with a gear 62 secured to a vertical shaft 63 extends upwardly into the cabin 26. This vertical shaft is connected through gearing 64 with a hand wheel 65 in the cabin. The vertical shaft 63 also extends downwardly into the hull and carries a sprocket 68 on the end thereof. A cable and chain means 66 passes around the sprocket and passes through an enclosing pipe 67 in the hull to a sprocket 69 secured to the vertical shaft 58 to which the holding key 57a is attached for the other arm of the rail mounting means. This operating or connecting means turns the two keys in opposite directions for engagement and disengagement with its flange. When it is desired to dump the load, the hand wheel is turned to rotate or withdraw the locking keys from holding position engaging its flange before opening of the flood valves. When the load has been dumped, the flood compartments emptied of water and the barge or scow has righted itself so that the rail is again resting on the deck, the hand wheel is turned to bring each holding key into contact with its holding shoulder to retain the rail means against the deck of the scow. The pipe 67 extends through the flood compartment means between the lateral partitions 31 (FIG. 2).

Means are provided to restrict the extent of movement of the rail means above the deck of the scow which means may take several forms. The particular means shown is a stop 71 carried by each abutment 50 to engage an arm of the mounting or arm means. When the barge begins to tilt in the dumping operation and the deck on the dumping side is submerged, the rail rises or floats above the deck because of its buoyancy and removes it as an obstruction to the load sliding off of the inclined deck. When the barge is tilted an amount sufficient to dump the load, which may be in the region of 30 to 45 degrees, the arm means engages the arm stop and prevents further movement of the buoyant rail and its arm with respect to the barge. As a consequence if the barge should tend to tilt somewhat more, the rail will partially submerge and its buoyancy is added to that of the hull and keeps the tilt of the barge within bounds. If the tilt of the barge should increase further for any reason, so that the rail is completely submerged, the entire buoyancy of the rail is added to that of the hull and this additional buoyancy is outwardly of the side of the hull. When partially or fully submerged, the rail gives considerable stability to the tilted hull.

With the load dumped off of the barge or scow, it does not rest as deeply in the water so that the water level of the water in the flood compartments is now above the outer water level W so that the water begins to drain out of the flood compartments through the inlets 34. With the water draining out of the flood compartments, the barge becomes increasingly buoyant and returns gradually to level position until the false or mid bottom rises above water level so that all water will drain out of the flood compartments. By means of a scoop 73 at each inlet 34 projecting outwardly from the hull and with its opening directed rearwardly of the barge, a suction action is created by the forward movement of the barge which speeds the draining out of water from the flood compartments.

It may be desirable to further speed the outflow of water from the flood compartments. To accomplish this there is an air pipe 74 extending to each of the flood compartments and located in the topmost corner of each compartment with an outlet 80 into each compartment. An air pump (FIG. 15) driven by a motor 76 pumps air into the flood compartments and through its pressure expels or pumps water therefrom. When this is to be done, an air valve 77 in a stand pipe 78 is closed so that the air from the pump is delivered to the flood chambers. When the water valves 35 are opened to allow water to flow into the flood compartments, this valve 77 is opened so that a vent is provided at the highest point in the flood compartments to allow air to escape through the air pipe and not to be trapped in the compartments. Drainage holes 79 (FIG. 2) are also provided in the air pipe.

It is desirable that a rubber gasket or seal 82 be carried by the bottom of the rail to assure a seal between the rail and the deck. It is desirable too that a plurality of scuppers 85 be provided from the inside of the rail to the side of the scow. These scuppers permit any water to drain out which may be loaded with the load or which may come over the rails. A check valve 86, FIG. 9, may be provided in each scupper to prevent water from flowing in. A screen on the scupper deck opening prevents solid material from passing through the scupper. To assure that the rail will not bend under the lateral pressure of the load, interengaging means are provided at intervals along the deck and rail. The means shown includes a block 83 secured to the deck and a flange 84 carried by the rail for each block and engaging therewith when the rail is resting on the deck. Movement of the rail away from the deck separates the interengaging means.

It is clear too that flood compartments and valves may be provided on the other side of the hull identical with those shown for dumping from either side if this should be desired. Since dumping is usually done at sea, there is no normal need for this additional structure.

Sometimes, such as in a rough sea, a load may shift on a barge or scow towards the nondump side which may make it somewhat more difficult to sink the barge on the dump side. For such an event, the rail on the opposite side from the dump side may be buoyant and mounted on means for floating this rail such as through arm means as described.

The rail is similarly constructed to have buoyancy as described so that some of the unbalanced load may be washed or dumped from this side to assist in righting the barge to a more level position, after which the dumping operation described may proceed. This rail will also have holding means 56, 57, 56a, 57a as described as well as stop means 71 to limit the extent of movement of the rail on this side away from the deck to give added buoyancy and stability.

In order to substantially reduce any shifting of the load, a barricade 87 (FIGS. 16-20) is provided extending lengthwise of and for the full length of the load deck. It is desirable that it be about as high as the load and hence is shown as high as the abutments 50 which is substantially higher than the rails. The barricade is pivotally mounted so that it will swing out of the way when dumping. Retaining means secures the barricade in vertical position with respect to the deck. Preferably the barricade is pivotally mounted at its top edge. The barricade may be given additional support such as by a central longitudinally extending frame or beam 88 which is carried well above the deck and is conveniently carried by the top of the abutments 50 and extend above the barricade. The barricade is shown as pivotally mounted at its upper edge on the supporting frame through barricade pivot means 89.

Retaining means are provided to retain the barricade in vertical position and preferably this means operates automatically to be released when the barge tilts far enough so that the rail is afloat and spaced above the deck. When the barricade with an automatic release is provided, the pivot 54a, FIGS. 17-20, is secured to the rail arms 53. The retaining means is shown as a retaining lever 92 secured to a pivot which for automatic release is the pivot 54a for the rail arm 53 so that when the rail is on the deck, the end of the retaining lever abuts a shoulder 93 carried by the arm edge of the barricade.

When the barge has tilted far enough when dumping so that the arm of the rail pivots upwardly far enough to bring the end of the retaining lever away from the shoulder or into a gap 94 in the end of the barricade and below the shoulder whereupon the barricade may tilt freely towards the dump side with the retaining lever passing through the gap. When the load has been dumped and the barge again assumes level position the barricade pivots to vertical position and engages a stop and the rail rests on the deck with its arm down whereupon the retaining lever 92 is projected behind or against the shoulder 93. The stop on the other side of the barricade may be a similar retaining lever secured to the pivot 54a on the arm for the buoyant rail on the other side of the deck. With this construction, the barricade may pivot in either direction. With the barricade retained or held in central position, shifting of the load to one side or the other is substantially limited or eliminated. Any shift which may occur would be half of the load to the rail on one side and on the other side the other half of the load would be shifted closer to the barricade rather than to have a large part of the entire load shifted over to one of the rails.

The dump barge or scow shown in FIGS. 21 through 33 differs from the dump barge described in that it is designed to discharge on one side only and to tilt at a greater dumping angle in order to more positively assure dumping of the load off of the barge. This barge also shows a mechanism for removing the longitudinal barricade from the barge in the event that the barge is to be used solely as a load transporting barge. Other features will be described hereinafter and similar parts are similarly numbered.

The barge of FIGS. 21 to 37 is designed to tilt at a greater angle when dumping. The partition 30 is located in the central region of the barge between the deck 22 and the bottom 23 and extends at an angle of about 45° in a direction to make the lateral bottom dimension of the flood compartment greater than the deck dimension. A false bottom is not provided so that the flood chamber or chambers extend from the deck to the bottom. Also the rail stop means 71a is located closer to the center so that the pivoting of the rail arm 53 may be tilted at a greater angle before it engages the stop means, that is when the load deck of the barge is tilted at about 45°, the rail is at least partially immersed in the water.

Since this barge is designed to dump from one side only a single separable buoyant rail 51 is shown carried on the arm 53 and is secured to the pivot 54 which is pivotally mounted in the abutment 50. The rail 51a on the opposite side is fixed to the barge and although it is of the same form and size as the rail 51, for purposes of equilibrium, it may be of any desired form. The floating of the rail 51 above the deck frees the retaining means for the barricade 87 which includes the retaining lever 92, which is secured to the arm pivot 54a. The end of the lever 92 engages a shoulder 93 carried by the barricade 87 so that when the barge tilts and the floating rail 51 is lifted off of the deck of the barge, the lever 92 is moved into the slot 94 in the edge of the barricade 87 and releases the barricade so that it may pivot on its pivot means 89 and allow the load to slide thereunder. Since this barricade is to swing in one direction only, stop lugs 87a are provided on the deck of the barge and engages one side of the barricade 87 so that it cannot swing in the opposite direction.

The barricade 87 is constructed so that it and its supporting frame may be removed from the barge in the event that the barge is to be used as a load transporting barge. The beam or frame 97 on the lower surface thereof and the upper edge of the barricade 87 carries the pivot means 89 to pivotally mount the barricade. The ends of the frame or beam are not fixed to the abutment 50. At the top of the abutment 50, a cradle 98 is provided comprising a pair of spaced plates 99 to receive the end of the beam 97. The lower edge of the end of the beam engages a shoulder or rest 100 located between the spaced plates 99 upon which the end of the beam is supported. A cradle is provided on each of the abutments 50 to receive the ends of the supporting frame or beam 97. It is desirable that the upper end of the cradle be closed in the event that the barge turns over, which may be accomplished by any suitable closing means, that shown being a removable locking plate 101 bolted to the plates 99.

In order to assure that the material to be dumped flows easily off of the inclined deck when the barge is tilted, a water flushing means is provided. This means includes a series of pipe 104, FIG. 28, extending along the length of the barge on one side thereof and having an outlet on the deck. These pipes are connected to a main 105 below the deck and extending lengthwise thereof. In order to direct the stream of water from each pipe along the deck surface, a cap 106 is secured to the deck over the end of the pipe 104 and with its outlet 107 directed along the surface of the deck. The main 105 is connected with the water pump 108, FIGS. 22 and 37, and the pump is driven by a suitable engine or motor 109. If desired, flushing water may also be supplied lengthwise of the barge and in the center area thereof through a series of pipes 112 having an outlet at deck level. These pipes are connected with the main 115, which is also connected with the pump 108.

The engine 109 may also drive an air pump or compressor 116 for supplying air under pressure to the flood compartments to empty them of water after the load has been dumped, and to drive power cylinders, as will appear. The engine may also drive a bilge pump 117. A suitable clutch mechanism, shown generally as a gear box 118, is used to connect the water pump to the engine. This gear box includes a driving gear 119, driven by the motor shaft, which gear drives a driven gear 120 carried on the jack shaft 121. A slide gear 122 is slidably mounted on and driven by the jack shaft so that it may engage with a driven pump gear 123 carried on the shaft of the water pump. The slide gear 122 also may be positioned on the stub shaft to engage a driven gear 124, carried on the shaft of the air pump. The slide gear may also be connected with a driven gear 125 for driving a bilge pump 117. The gears 124 and 125 may be located so that they are connected with the slide gear 122 at the same time.

Sometimes the movable rail may not rise freely such as with a load of rocks because of the pressure of the rocks on the inner side of the rail. In order to overcome initial binding of the movable rail, jacks may be provided to give an initial lift to the rail in order to free the same. The jacks particularly illustrated is an air cylinder 130 (FIG. 39) secured to the hull in any suitable manner and having a piston rod 131 projecting from the upper end thereof. The jack engages the arm at any suitable point to raise the same. In the construction illustrated the arm may carry an extension plate 132 secured to the top surface of the arm and which projects over the end of the piston rod 131. Upon extension of the piston rod the plate and the rail is raised. The inclined surface of the rail and the upward movement of the rail as it rises easily frees the rail from the internal pressure. A check is provided at each end of the rail.

The air cylinder 130 is connected with the air pump 116 through a pipe 135 having a two-way valve 136 therein. When an air jack is provided the air pipe 74 is also provided with a valve 137. An air pipe 138 extends to a similar jack provided on the other end of the rail and passes through the same passageway which carries the valve operating shaft 38. The air under pressure is fed to the lower end of the piston within the air cylinder to raise the same and the air on the upper side is exhausted through an air vent 139. With air exhausted from the pipe 135 the weight of the piston and rail presses the piston to the bottom of the cylinder.

The barge or scow, illustrated in FIGS. 43 to 45 is constructed with an inclined partition in the central region of the hull so that one side of the hull may be flooded and subsequently pumped out. This barge is not a dump barge as shown in FIGS. 1 through 42, but it is designed to effect righting in the event it should turn over.

Sometimes a loaded barge, due to cross currents and cross pull of the tug, will overturn and it is difficult to re-right the barge. By flooding the compartment on one side of the overturned barge it will sink the flooded side of the barge to a vertical position and around to a tilt position with the deck on the top. Then by pumping the water out of the flood compartment or chamber, the barge may be fully righted in an inexpensive and efficient manner.

An overturned barge must have access to the flood compartment from the bottom or adjacent the bottom of the barge so that they can be filled with water. A pipe, therefore, extends from the flood compartment to the bottom region of the barge and it is closed with a watertight removable cap so that a pump may be connected therewith and water pumped into the flood compartment.

When the barge has been righted sufficiently to bring the deck to an inclined upward position, the water in the flood compartment may be pumped out either with a pump or by pumping air into the compartment to displace the water through discharge openings.

The barges of FIGS. 1 through 37 are also easily righted in the event they should turn over since it is already equipped with the necessary flood compartments or chambers and discharge openings with valves at the bottom of the flood chambers and connections for forcing air into the flood compartments to pump the water out of chambers by air displacement. These barges, therefore, are also shown with a connection to the flood compartments in the bottom region of the barge.

The barges shown in all of the figures have flood compartment means with connecting means to flood and to discharge water from the flood compartments. One connection is a flood or inlet connection which is the connection 35 for the dump barges of FIGS. 1 to 42 and connection 142 for the barge of FIGS. 43–44. Means is provided to open and close the flood connection which is the valve 35 in the barges of FIGS. 1–42 and the closing cover plate 146 for the barge of FIG. 43. A second connection is provided to the flood compartment means which is the air vent connection 74, 78 of the barge of FIGS. 1–42, which connection also serves as a pump-out connection in the event an air displacement pump is connected therewith such as air pump 75, FIGS. 15 and 37. The second or top side connection in the barge of FIG. 43 is the connection 143 which serves as a pump-out connection. The means to open and close the second connection is the valve 77, FIG. 15 and the cover plate 146 of the barge of FIG. 43.

A barge will sometimes capsize whether it is a dump barge with flood compartment means or a barge used solely for transporting goods. It is an expensive operation to right a capsized barge as presently built. It is a relatively simple matter to right a capsized barge when it is provided with flood compartment means or one or more flood compartments formed by a longitudinally extending and angularly positioned partition carried by the hull. Connecting means are provided for access to the flood compartment means for filling the same with water to partially right the barge and for pumping out the water thereafter to complete the righting of the barge. The barge hull 23 of FIGS. 43 through 46, shown as capsized in FIG. 43, has a longitudinally extending and angularly disposed partition 30 extending the full length or part of the length of the hull which divides the hull into flood compartment means having one or more flood compartments as desired. The angular mid-partition 30 provides a greater lateral dimension at the bottom than at the deck and the angularity is shown as 45° although it may be greater or less than this.

Each flood compartment has a flood or bottom inlet connection 142 leading into the flood compartment adjacent to the apex of the compartment or at the junction of the partition 30 and the bottom. This connection has its outlet in the bottom of the hull or adjacent thereto as shown, which is in the bottom region of the hull. The outlet for the flood or inlet connection must be in a location which is accessible when the barge is in capsized position.

A pump-out or top side connection 143 is provided for each compartment which extends to the corner of the hull adjacent the deck and side wall 24. This connection has an outlet adjacent to or, as shown, on the deck 22 of the barge and is located in the opposite corner of the hull from the inner end of the connection. It is located so that it is accessible to be opened and above the water line when the barge is partially righted as in the position of FIG. 44.

FIGS. 45 and 46 illustrate, in enlarged scale, a closing structure of suitable form for each of outlets of the connections 142 and 143. It includes a ring 145 welded to the inner surface of the deck at the outlet opening of the connection 142 and 143 at the hull. A closing cover plate 146 closes the opening for each of the connections. A gasket 147 under the plate keeps each outlet or inlet opening water tight. The cover plate is secured to the ring 145 by bolts 148, and preferably recessed so that it does not project beyond the outer surface of the hull.

When a barge is capsized, as shown in FIG. 43, water is pumped into the flood compartment means through the flood connection. The cover plate 146 for the flood connection is removed and a hose projected through the connection. Water is pumped into the flood compartment through the hose and air escapes through the connection. As the flood compartments are filled with water, the flooded side of the barge gradually sinks and because of the inclined partition 30, when the compartment means is fully flooded, the barge has swung around to an inclined position with the dock in uppermost position. The hose is withdrawn from the flood connection 142 and its cover plate 146 is bolted in place whereupon the cover plate for the pump out connection 143 is removed and a hose inserted through the connection 143 to now pump the water out of the flood compartment means. When the water has been fully pumped out of the flood compartment means, the barge has been righted and floated and is ready for use. The cover plate 146 for the pump-out connection is secured in place over the deck outlet for this connection.

By providing these same connections to the flood compartment means of the dump barges of FIGS. 1 through 42, these barges also may be easily righted in the event that one has overturned or capsized. The method of re-righting the dump barges is the same as that described above.

Tests of a scale model indicate that for a dump barge of about 40 feet width, dumping is more effective if the inclined mid-partition 30 is located about three feet to the starboard of the barge center line with a flood compartment means on the port side. This is for a barge in which the flood compartment means does not extend the full length of the hull. It has been found, too, that preferably the arms for the floating rail have a movement of about 60° with respect to the deck, so that the rail stops 71 should be located to give this amount of angular freedom. By making the rail five feet high for the example of barge dimension heretofore mentioned, the rail is higher for retention of the dumping load and also increases the buoyancy of the float rail.

This invention is presented to fill a need for improvements in a barge with flood compartment means for dumping and righting. It is understood that various modifications in structure, as well as changes in mode of operation, assembly and manner of use, may and often do occur to those skilled in the art, especially after benefiting from the teachings of the invention. This disclosure illustrates the preferred means embodying the invention in useful form.

I claim:

1. A barge comprising a hull having a deck, sides, a hull bottom, and ends; partition means dividing the interior of the hull into flood compartment means on one side of the hull and an air chamber on the other side including a longitudinally extending partition between the deck and at least a mid bottom, the partition being such that the lateral bottom dimension of said flood compartment means is substantially greater than the lateral dimension at the deck; means to flood and discharge water from said flood compartment means including an inlet means into said flood compartment means comprising a bottom connection between said flood compartment means and the hull having a bottom inlet in the bottom region of the hull, means closing the bottom inlet, a topside connecting means between said flood compartment means and the hull having an inlet in the top region of the hull, means closing said topside connection inlet, and the inlets of the connections being on the opposite side of the hull from the flood compartment means.

2. A barge as in claim 1 in which the closing means for each connection is a removable watertight plate.

3. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, holding means engaging said buoyant rail means to hold the rail against the deck, and means to release and engage the holding means.

4. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, the rail means includes a buoyant float rail on the other side of the load deck, and means mounting this float rail for movement off the deck.

5. A barge as in claim 3 in which the holding means includes at least one holding flange carried by the rail means, and a holding key carried by the barge and movable into and away from engagement with the holding flange, and means connected with the holding key to move the same to and from holding engagement with the flange.

6. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means in said inlet means, an an air vent means at the top of said flood compartment means; rail means including a rail on each side of the hull and engaging the deck and extending the full length of the load carrying deck; mounting means carried by the hull and mounting at least one rail for movement towards and away from the deck, said movably mounted rail being enclosed on all sides and ends forming an air chamber and a buoyant rail, the hull including abutments above the load deck at each end thereof, the rail means including a rail arm at each end of said rail and secured to the latter, pivot means pivotally mounting one end of each arm in its abutment at a substantial distance from the rail, a holding flange carried by at least one arm, and a holding key pivotally carried by the abutment and movable into engagement with and away from the holding flange.

7. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, interlocking means to give lateral support to said movable rail carried by said rail between the ends thereof and carried by the deck and separable upon movement of the rail away from the load deck.

8. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, a barricade extending lengthwise of the load deck and between the sides of the deck, the barricade having an upper edge and a lower edge, barricade pivot means pivotally mounting an edge of the barricade for pivotal movement to and from a vertical position with respect to the deck, and barricade retaining means holding the barricade in vertical position.

9. A barge as in claim 8 including a beam extending lengthwise of the barge above the deck, and the barricade pivot means being carried by the upper edge of the barricade and by the beam.

10. A barge as in claim 9 including beam cradles carried by the hull above the deck and at least at each end of the load deck to removably receive the beam.

11. A barge as in claim 8 including means connecting the rail means with the barricade retaining means to release the latter upon floating of the rails above the deck.

12. A barge as in claim 11 in which the mounting means for said movable rail includes at least two arms for each movable rail and secured to the rail, an arm pivot for each arm pivotally mounting the arm to the hull adjacent to the barricade and secured to the arm, and the barricade retaining means including a retaining lever connected with each arm pivot and said lever engaging one side of the barricade when said movable rail is on the deck and disengaging the barricade when the rail rises above the deck.

13. A barge as in claim 12 in which the barricade retaining lever is secured to the arm pivot, and a gap in the edge of the barricade adjacent to the lever into which the lever pivots when the movable rail is raised.

14. A barge as in claim 11 including a second barricade retaining means on the other side of the barricade, the second rail means having a floating rail on the other side of the barge, and means connecting said second rail means with the second barricade retaining means to release the latter upon floating of the rail.

15. A barge as in claim 14 including a beam extending longitudinally of and above the deck, the barricade pivot means being carried by the beam and the upper edge of the barricade, cradle means for the beam including a cradle at least at the ends of the beam and removably receiving the ends of the beam.

16. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, a bottom connection between the flood compartment and the hull with a bottom inlet in the bottom region of the hull, means closing the bottom inlet, a top-side connection between the flood compartment and the hull having an inlet in the top region of the hull, means closing the said top-side connection inlet, and said bottom and top-side connecting inlets being on the opposite side of the hull from the flood compartment means.

17. A barge comprising a hull having a load deck, sides, a hull bottom and ends; partition means dividing the interior of the hull into a flood compartment means on one side of the hull and air chamber means on the other side of the hull, the partition means including a longitudinally extending partition between the deck and at least a mid bottom, the partition extending at an angle such that the bottom lateral dimension of said flood compartment means is substantially greater than the lateral dimension of said flood compartment means at the deck; means to flood and to discharge water from said flood compartment means including inlet means into said flood compartment means, valve means in said inlet means, operating means for the valve means, and an air vent means at the top of said flood compartment means; rail means including a rail on each side of the hull and engaging the deck and extending the full length of the load carrying deck; mounting means carried by the hull and mounting at least one rail for movement towards and away from the deck, said movable mounted rail being enclosed on all sides and ends forming an air chamber and a buoyant rail, power means connected with said movable rail to initially raise the same.

References Cited by the Examiner

UNITED STATES PATENTS

| | | | |
|---|---|---|---|
| 208,629 | 10/78 | Ouerton | 114—38 |
| 1,128,707 | 2/15 | Middaugh | 114—27 |
| 1,295,056 | 2/19 | Otterson | 298—8 X |
| 1,757,495 | 5/30 | Zickerow et al. | 114—27 |
| 1,786,514 | 12/30 | Bickell | 114—27 |
| 3,075,812 | 1/63 | Niece | 298—8 |

FERGUS S. MIDDLETON, *Primary Examiner.*

MILTON BUCHLER, *Examiner.*